US009964255B2

(12) United States Patent
Fruh

(10) Patent No.: US 9,964,255 B2
(45) Date of Patent: May 8, 2018

(54) BEHIND-WALL TELEVISION MONITOR WALL MOUNT

(71) Applicant: DISH Technologies L.L.C., Englewood, CO (US)

(72) Inventor: Jason Matthew Fruh, Castle Rock, CO (US)

(73) Assignee: DISH Technologies L.L.C., Englewood, CO (US)

( * ) Notice: Subject to any disclaimer, the term of this patent is extended or adjusted under 35 U.S.C. 154(b) by 319 days.

(21) Appl. No.: 14/506,174

(22) Filed: Oct. 3, 2014

(65) Prior Publication Data

US 2016/0095439 A1    Apr. 7, 2016

(51) Int. Cl.
*H02G 3/12* (2006.01)
*F16M 13/02* (2006.01)

(52) U.S. Cl.
CPC ................. *F16M 13/02* (2013.01)

(58) Field of Classification Search
CPC .... H02G 3/126; F16M 11/2014; F16M 11/08; E04B 1/2608
USPC ......... 248/207, 218.4, 219.3, 219.4
See application file for complete search history.

(56) References Cited

U.S. PATENT DOCUMENTS

| 4,747,506 A * | 5/1988 | Stuchlik, III | 220/3.9 |
| 4,801,121 A * | 1/1989 | Zunker | 248/551 |
| 4,804,094 A * | 2/1989 | Eittreim | 211/88.01 |
| 8,418,861 B1 * | 4/2013 | Weaver et al. | 211/90.02 |
| RE45,430 E * | 3/2015 | Gorman | 174/58 |
| 2011/0174944 A1 * | 7/2011 | Fredette | 248/220.22 |

* cited by examiner

*Primary Examiner* — Brian E Glessner
*Assistant Examiner* — Daniel J Kenny
(74) *Attorney, Agent, or Firm* — Seed IP Law Group LLP

(57) ABSTRACT

In various embodiments, a television monitor wall mount is provided that allows a television monitor to be mounted flush against a wall, such as directly against the SHEETROCK, drywall or other wall surface material. When attached behind a wall to a wall stud, the television wall mount serves as a bracket to support the weight of the television monitor that is located on the front side of the wall. The weight of the television monitor is supported by bolts which extend through a mounting plate surface behind the wall and through the wall and into the back of the television monitor that is on the front side of the wall. When tightened, these bolts secure the back of the television monitor flush against the first front side of the wall.

13 Claims, 6 Drawing Sheets

BEHIND-WALL TELEVISION MONITOR WALL MOUNT

BRIEF SUMMARY

A television monitor wall mount allows a television monitor to be mounted flush against a wall, for example directly against the SHEETROCK, drywall or other wall surface material. In one embodiment, the television wall mount includes a first mounting plate surface configured to be attached behind the wall to a wall stud that is located behind the wall. A second mounting plate surface connected to the first mounting plate surface is configured to be attached to the back side of the wall that is opposite the front side on which the television monitor is to be hung. The second mounting plate surface has at least one hole through which a fastener is able to be placed to mount the television monitor on the first side of the wall opposite the second side.

BRIEF DESCRIPTION OF THE DRAWINGS

Like reference numerals designate corresponding parts throughout the several views.

DETAILED DESCRIPTION

Figure 1:
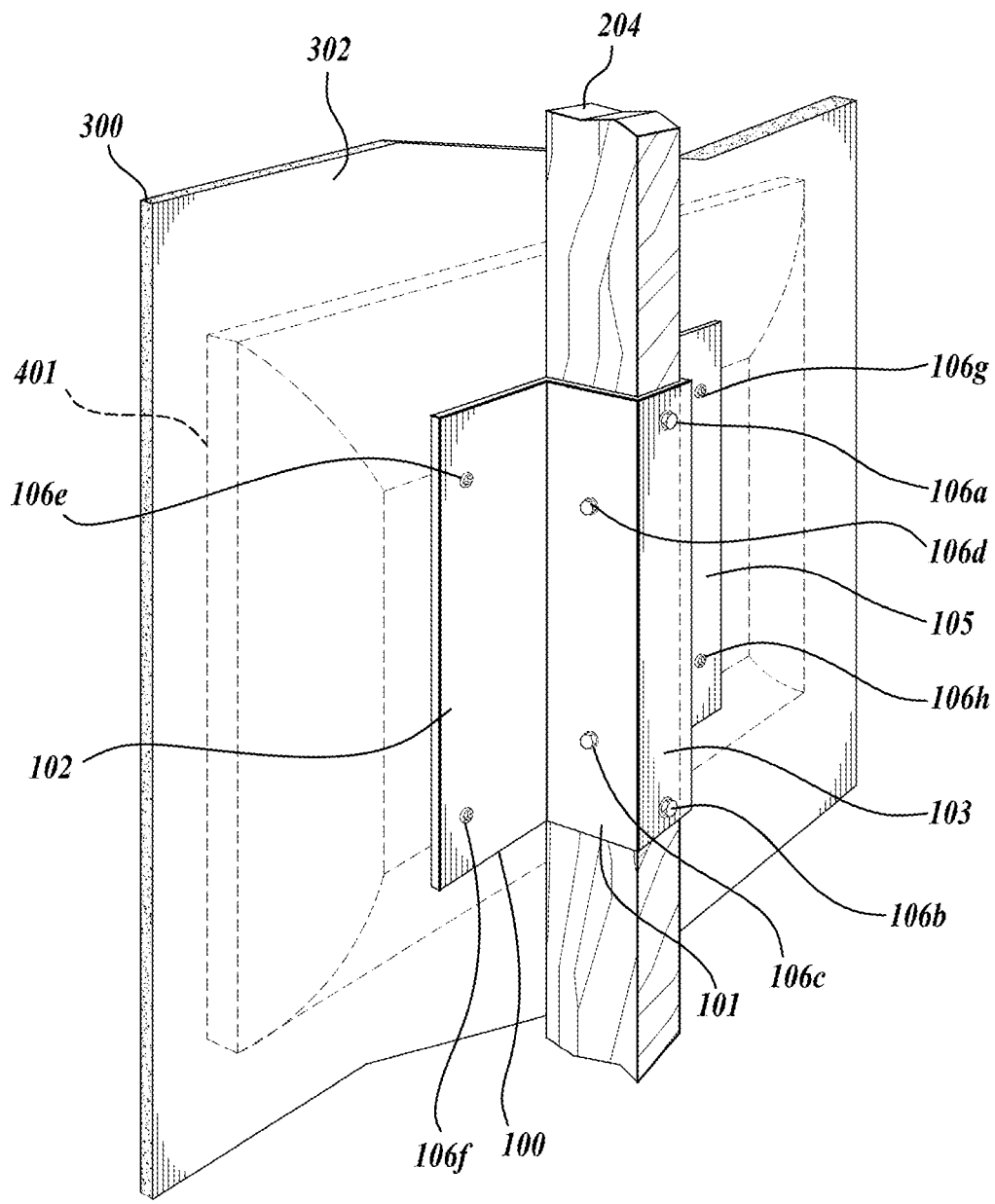
FIG. 1 is a back perspective view of television monitor wall mount installed behind a wall on a wall stud, according to one example embodiment.

Shown in FIG. 1 is a back perspective view of television monitor wall mount 100 installed behind a wall 300 on a wall stud 204, according to one example embodiment. A wall 300 has a first side 301 (shown in FIG. 4) on which the television monitor 401 is to be mounted and a second side 302 opposite the first side. There are many traditional mounting brackets for televisions on the market that attempt to place the television (TV) as close to the wall 300 as possible, but none allow for the TV to be mounted flush against the wall 300 with no gap between the television monitor 401 and the wall. The television monitor wall mount 100 shown in FIG. 1 and other embodiments described herein allow the television monitor 401 to be mounted flush against a wall 300, for example directly against the SHEETROCK, drywall or other wall material.

In particular, television wall mount 100 includes a first mounting plate surface 101, a second mounting plate surface 102, a third mounting plate surface 103, a fourth mounting plate surface 104 (shown in FIG. 4), and a fifth mounting plate surface 105. The first mounting plate surface 101 is connected along a lengthwise edge to the second mounting plate surface 102, the second mounting plate surface 102 is connected along a lengthwise edge to the third mounting plate surface 103, the third mounting plate surface 103 is connected along a lengthwise edge to the fourth mounting plate surface 104, and the fourth mounting plate surface 104 is connected along a lengthwise edge to the fifth mounting plate surface 105. The first mounting plate surface 101, third mounting plate surface 103 and fourth mounting plate surface 104 of the television wall mount 100 are solid planar surfaces and together form a shape that surrounds exposed surfaces of the wall stud 204 that is located behind the wall 300.

The second mounting plate surface 102 and fifth mounting plate surface 105 of the television wall mount 100 are solid planar surfaces that touch the second side 302 of the wall 300, when the television wall mount 100 is placed on the wall stud 204 as shown in FIG. 1. As shown in FIG. 1, screws 106c and 106d fasten the first mounting plate surface 101 to a first planar surface 201 (shown in FIG. 4) of the wall stud 204 and screws 106c and 106d fasten the third mounting plate surface 103 to a second planar surface 202 (shown in FIG. 4) of the wall stud 204. Thus, when attached to the wall stud 204 as shown in FIG. 1, the television wall mount 100 serves as a bracket to support the weight of the television monitor 401 that is located on the first side 301 of the wall 300 opposite to the second side 302 of the wall 300. The weight of the television monitor 401 is supported by bolts 106e and 106f and by bolts 106g and 106h, which extend, respectively, through the second mounting plate surface 102 and fifth mounting plate surface 105 through the wall 300 and into the back of the television monitor 401 that is on the first side 301 of the wall 300. When tightened, these bolts, 106e, 106f, 106g and 106h, secure the back of the television monitor 401 directly, or nearly directly, flat against the first side 301 of the wall 300.

The first mounting plate surface 101, second mounting plate surface 102, third mounting plate surface 103, fourth mounting plate surface 104 and fifth mounting plate surface 105 may be integral, formed from one solid piece of material, or they may be individually welded, glued, melded, hinged, fastened or otherwise connected to each other from separate pieces of solid material. For example, the television wall mount 100 may be formed by bending at right angles an aluminum sheet or other type of metal sheet at appropriate locations to form the first mounting plate surface 101, second mounting plate surface 102, third mounting plate surface 103, fourth mounting plate surface 104 and fifth mounting plate surface 105. The solid material of which the television wall mount 100 is made may be any material of suitable strength, stiffness and resilience to be attached to the wall stud 204 and support the weight of itself and the television 401. For example, such material may be selected from, but is not limited to: aluminum, steel, iron, various other types of metals or alloys, hard plastic, hard rubber, or a combination thereof.

Figure 2:
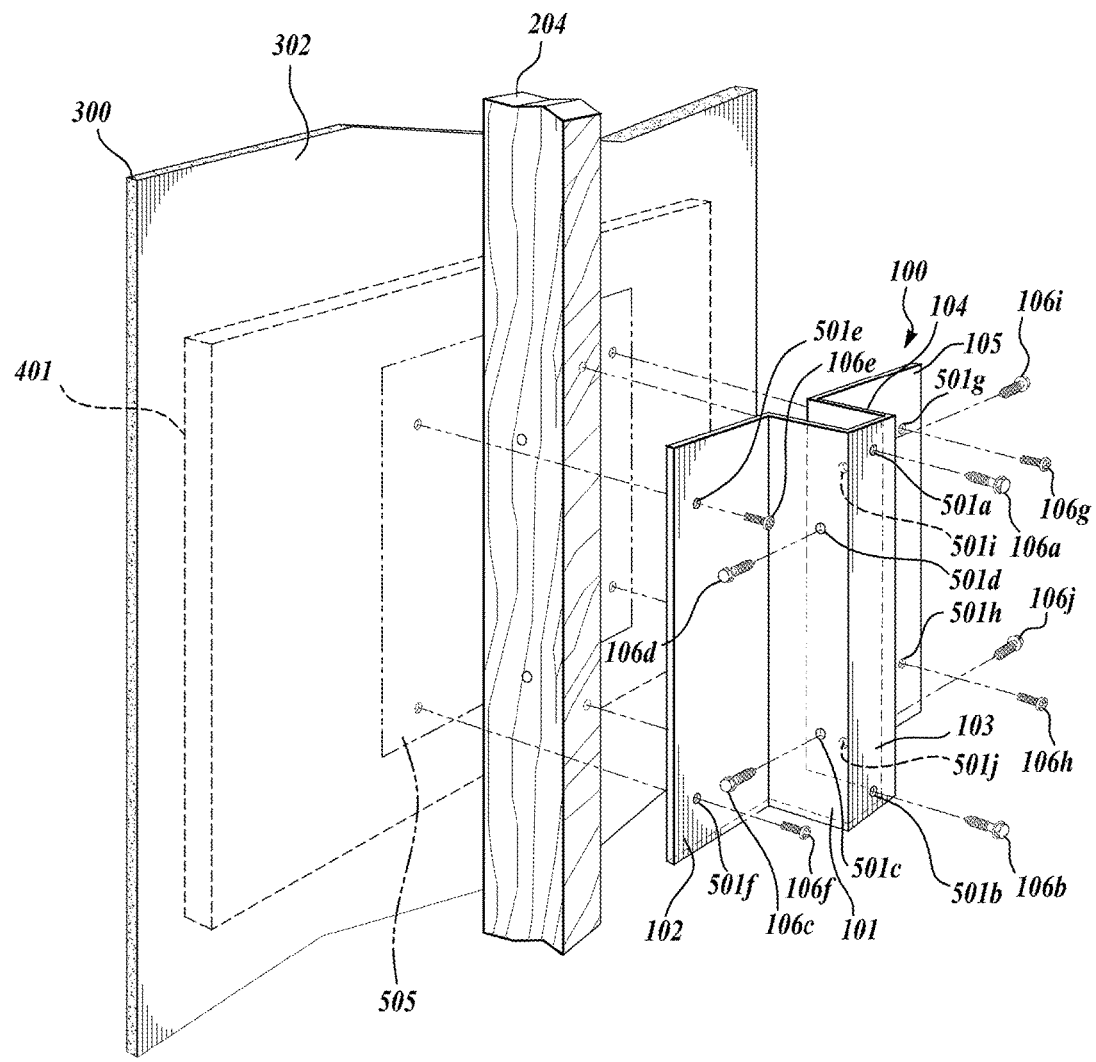
FIG. 2 is a back perspective exploded view of the television monitor wall mount installed behind the wall of FIG. 1, according to one example embodiment.

Shown in FIG. 2 is a back perspective exploded view of the television monitor wall mount 100 installed behind the wall 300 of FIG. 1, according to one example embodiment.

The first mounting plate surface 101 is configured to abut a surface of the wall stud 204 and to be attached behind the wall 300 to the wall stud 204. The first mounting plate surface 101 has at least one hole through which a fastener is able to be placed to attach the first mounting plate surface 101 behind the wall 300 to a first planar surface 201 (shown in FIG. 4) of the wall stud 204. For example, shown are holes 501c and 501d in the first mounting plate surface 101 of the television wall mount 100. Screws 106c and 106d go through holes 501c and 501d, respectively, and are screwed into the first planar surface 201 (shown in FIG. 4) the stud 204 to attach the television wall mount 100 to the stud 204.

The third mounting plate surface 103 is configured to abut a second planar surface 202 (shown in FIG. 4) of the wall stud 204 located behind the wall 300. The third mounting plate surface 103 has at least one hole through which a fastener is able to be placed to attach the third mounting plate surface 103 behind the wall 300 to the second planar surface 202 (shown in FIG. 4) of the stud 204. For example, shown are holes 501*a* and 501*b* in the third mounting plate surface 103 of the television wall mount 100. Screws 106*a* and 106*b* go through holes 501*a* and 501*b*, respectively, and are screwed into the second planar surface 202 (shown in FIG. 4) of the stud 204 to attach the television wall mount 100 to the stud 204.

The fourth mounting plate surface 104 is configured to abut a third planar surface 203 (shown in FIG. 4) of the wall stud 204 located behind the wall 300. The fourth mounting plate surface 104 has at least one hole through which a fastener is able to be placed to attach the fourth mounting plate surface 103 behind the wall 300 to the third planar surface 203 (shown in FIG. 4) of the stud 204. For example, shown are holes 501*i* and 501*j* in the fourth mounting plate surface 104 of the television wall mount 100. Screws 106*i* and 106*j* go through holes 501*i* and 501*j*, respectively, and are screwed into the third planar surface 203 (shown in FIG. 4) of the stud 204 to attach the television wall mount 100 to the stud 204.

The second mounting plate surface 102 is configured to be attached behind the wall 300 to the second side of the wall 302 that is opposite the first side 301 on which the television monitor 401 is to be mounted. The second mounting plate surface 102 has at least one hole through which a fastener is able to be placed to mount the television monitor 401 on the first side 301 of the wall 300 opposite the second side 302 of the wall 300. For example, shown are holes 501*e* and 501*f* in the second mounting plate surface 102 of the television wall mount 100. Bolts 106*e* and 106*f* go through holes 501*e* and 501*f*, respectively, and then through the wall 300 and into the back side 505 of the television monitor 401 to mount the television monitor 401 on the first side 301 of the wall 300 opposite the second side 302 of the wall 300.

The fifth mounting plate surface 105 is also configured to be attached behind the wall 300 to the second side of the wall 302 that is opposite the first side 301 on which the television monitor 401 is to be mounted. The fifth mounting plate surface 105 has at least one hole through which a fastener is able to be placed to mount the television monitor 401 on the first side 301 of the wall 300 opposite the second side 302 of the wall 300. For example, shown are holes 501*g* and 501*h* in the second mounting plate surface 102 of the television wall mount 100. Bolts 106*g* and 106*h* go through holes 501*g* and 501*h*, respectively, and then through the wall 300 and into the back side 505 of the television monitor 401 to mount the television monitor 401 on the first side 301 of the wall 300 opposite the second side 302 of the wall 300.

Figure 3:
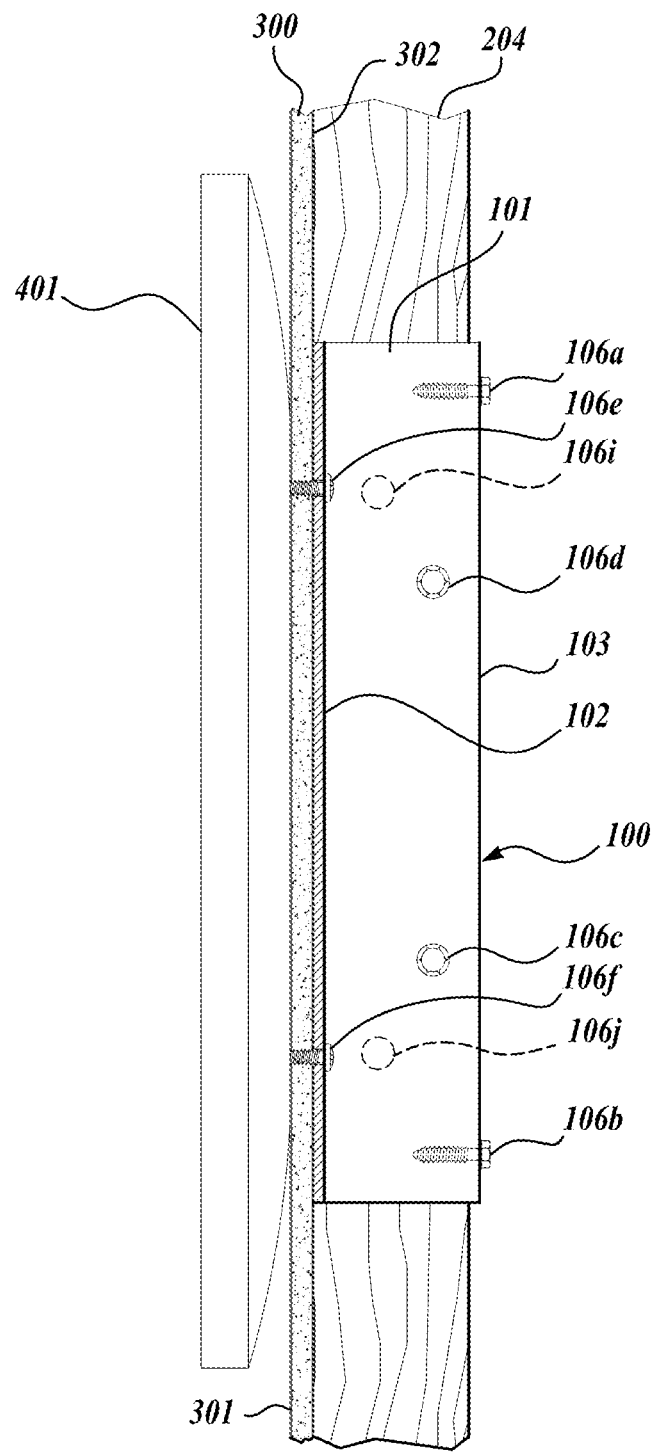
FIG. 3 is a side elevation view of the television monitor wall mount installed behind the wall of FIG. 1, according to one example embodiment.

Shown in FIG. 3 is a side elevation view of the television monitor wall mount 100 installed behind the wall 300 of FIG. 1, according to one example embodiment.

In FIG. 3, an example height of the television wall mount 100 can be more clearly seen. In FIG. 3, the height of the television wall mount 100 is less than the height of the television monitor 401. However, in various embodiments, the height of the television wall mount 100 may be more or less than the height of the television wall mount 100. Also, FIG. 3 shows in the example embodiment how the screws 106*c* and 106*d* that go through the first mounting plate surface 101 into the wall stud 204 are offset from the screws 106*i* and 106*j* that go through the fourth mounting plate surface 104 on the opposite side of the wall stud 204. These screws and corresponding holes in the television wall mount 100 are offset an amount to ensure that the screws 106*d* and 106*c* do not touch the screws 106*i* and 106*j* when screwed into the wall stud 204.

Figure 4:
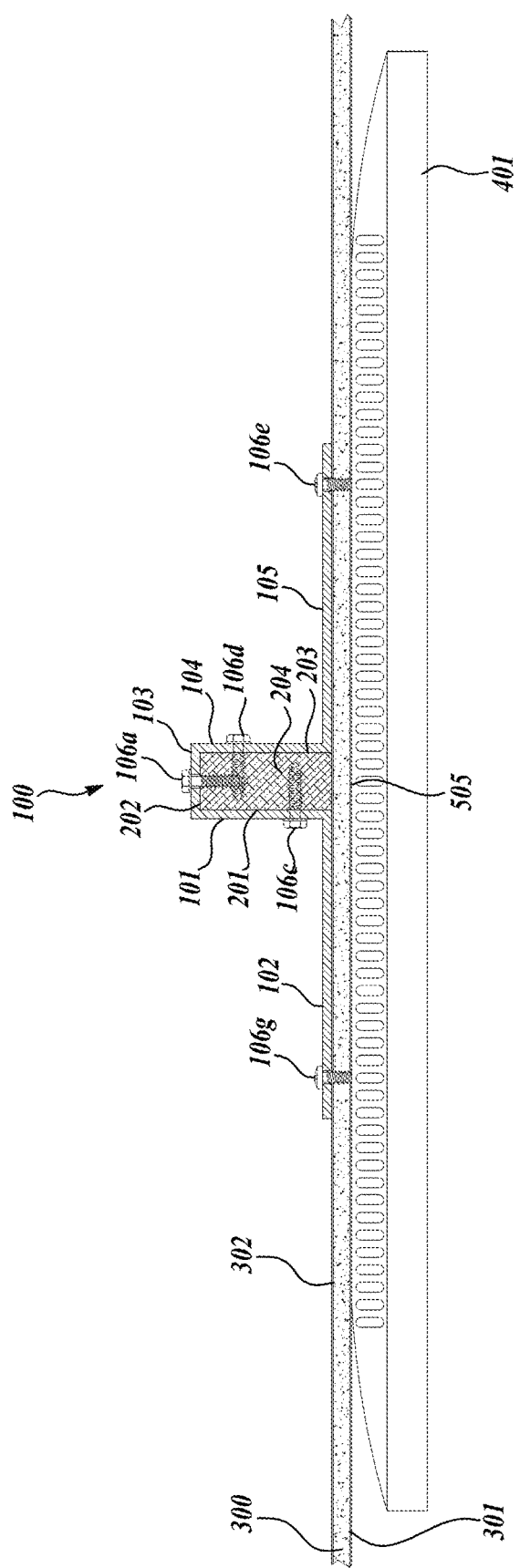
FIG. 4 is a top plan view of the television monitor wall mount installed behind the wall of FIG. 1, according to one example embodiment.

Shown in FIG. 4 is a top plan view of the television monitor wall mount 100 installed behind the wall 300 of FIG. 1, according to one example embodiment, showing a cross-sectional view of the wall stud 204 behind the wall 300 to which the television wall mount 100 is attached.

In FIG. 4, the first planar surface 201 of the wall stud 204, the second planar surface 202 of the wall stud 204, and the third planar surface 203 of the wall stud 204 can be more clearly seen. As shown in FIG. 4, the first mounting plate surface 101 abuts the first planar surface 201 of the wall stud 204 and is attached behind the wall 300 to the wall stud 204. The third mounting plate surface 103 abuts the second planar surface 202 of the wall stud and the fourth mounting plate surface 104 abuts the third planar surface 203 of the wall stud 204. FIG. 4 shows how screws 106*a*, 106*c* and 106*d* are screwed into the respective planar surfaces 203, 201 and 204 of the wall stud 204, attaching the television wall mount 100 to the stud 204, and are offset vertically from each other to avoid touching each other when screwed into the wall stud 204.

In various alternative embodiments, other fasteners may be used to attach the television wall mount 100 to the wall stud 204 instead of screws, including, but not limited to, one or more of: bolts, pins, bars, hooks, nails, tacks, latches, staples, clips, rivets, glue, clamps, tape or other fasteners and fastening means.

The second mounting plate surface 102 is attached behind the wall 300 to the second side of the wall 302 that is opposite the first side 301 on which the television monitor 401 is mounted. The second mounting plate surface 102 has at least one hole through which a fastener is able to be placed to mount the television monitor 401 on the first side 301 of the wall 300 opposite the second side 302 of the wall 300. For example, shown are bolts 106*g* and 106*e* going through the wall 300 and into the back side 505 of the television monitor 401 to mount the television monitor 401 flush against the first side 301 of the wall 300 opposite the second side 302 of the wall 300. In various alternative embodiments, other fasteners may be used to attach the television wall mount 100 to the second side 301 of the wall 300 and to the television monitor 401 instead of bolts, including, but not limited to, one or more of: screws, butterfly bolts, anchors, toggle bolts, pins, bars, hooks, nails, clips and other fasteners and fastening means that are able to go through the wall 300 and fasten to the back side 505 of the television monitor 401.

In various alternative embodiments, the wall stud 204 may be round, flat, beveled, curved or some other shape, and the television wall mount 100 is then shaped similarly to conform to the shape of the wall stud or otherwise shaped to make contact with the differently shaped wall stud 204 such that it may be securely attached to the wall stud 204.

In various alternative embodiments, the television wall mount 100 may have fewer mounting plate surfaces than shown in FIG. 4 that are configured to be attached to the wall stud 204. In some embodiments, the television wall mount 100 may have only one mounting plate surface that is configured to be attached to the wall stud 204 to secure the television wall mount 100 to the wall stud 204. In embodiments where the television wall mount 100 has only one mounting plate surface to secure the television wall mount 100 to the wall stud 204, then this one mounting plate surface is connected to either mounting plate surface 102 configured to be attached to the second side 302 of the wall 300 or mounting plate surface 105 that is configured to be attached to the second side 302 of the wall 300.

Figure 5:
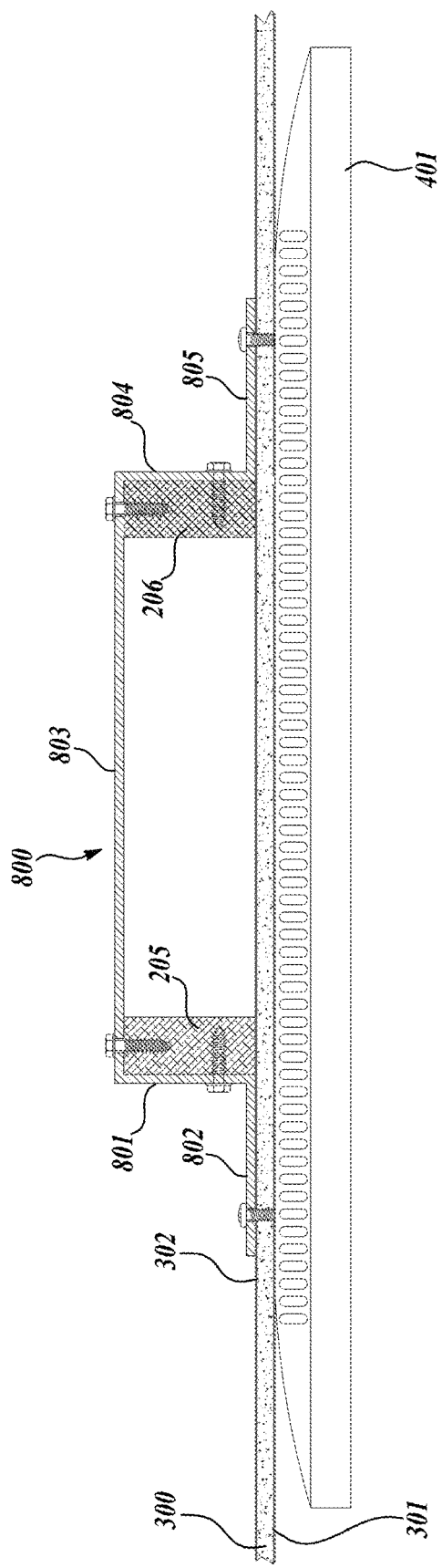
FIG. 5 is a top plan view of an alternative embodiment of a television monitor wall mount installed behind the wall of FIG. 1, according to an example alternative embodiment.

Shown in FIG. 5 is a top plan view of an alternative embodiment of a television monitor wall mount 800 shown installed behind the wall 300 of FIG. 1, according to one example alternative embodiment. Instead of being attached to one wall stud, the alternative embodiment of FIG. 5 shows an alternative television monitor wall mount 800 attached to two wall studs, which are wall stud 205 and wall stud 206. A first mounting plate surface 803 of the television monitor wall mount 800 abuts the back planar surfaces of both wall stud 205 and wall stud 206 and is attached by screws to the back planar surfaces of both wall stud 205 and wall stud 206. A second mounting plate surface 801 of the television monitor wall mount 800 abuts the a side planar surface of wall stud 205 and a third mounting plate surface 804 of the television monitor wall mount 800 abuts an opposite side planar surface 804 of wall stud 206. As shown, the second mounting plate surface 801 is attached by at least one screw to the side planar surface of wall stud 205 and the third mounting plate surface 804 is attached by at least one screw to the opposite side planar surface of wall stud 206. Mounting plate surfaces 802 and 805 are attached to the second side of the wall 302 by bolts which go through the wall 300 and attach to the television monitor 401 on the opposite first side of the wall 300. Various alternative means for fastening other than bolts and screws may also be used, such as those described above with respect to television wall mount 100.

In various other embodiments, the first mounting plate surface 803 of the television monitor wall mount 800 may abut the back planar surface of more than two studs, or may be adjustable to span various different lengths, such as to accommodate various different numbers and sizes of studs as well as different sizes of television monitors. This may be accomplished by the first mounting plate surface 803 being comprised of two or more sub-segments that may be fastened together at selectable different locations on the sub-segments to make the total length of the first mounting plate surface 803 vary accordingly. Alternatively, such various sub-segments of the first mounting plate surface 803 may be slidably adjustable on tracks located lengthwise along the various sub-segments of the first mounting plate surface 803.

Figure 6:
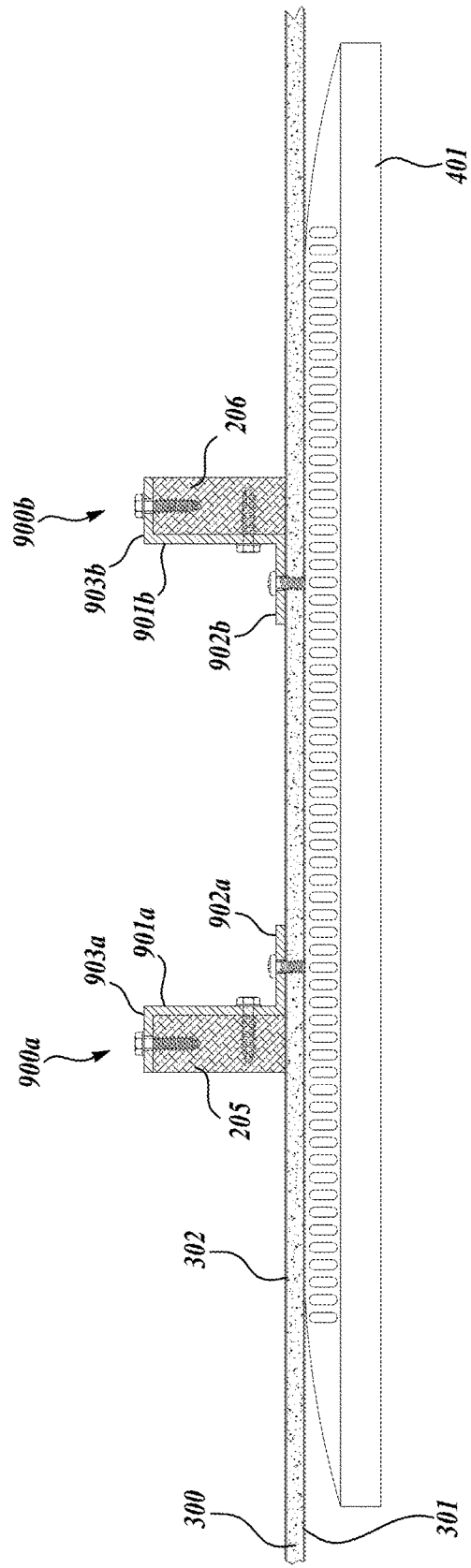
FIG. 6 is a top plan view of a television monitor wall mount kit installed behind the wall of FIG. 1, according to one example alternative embodiment.

Shown in FIG. 6 is a top plan view of a television monitor wall mount kit installed behind the wall 300 of FIG. 1, according to one example alternative embodiment.

Shown are a first piece of the wall mount kit 900a and a second piece of the wall mount kit 900b. The first piece of the wall mount kit 900a includes a first mounting plate surface 901a connected to a second mounting plate surface 903a configured to be attached behind the wall 300 to a second wall stud 205 that is located behind the wall 300. The first mounting plate surface 901a and second mounting plate surface 903a are configured to be attached, for example, by screws, to respective surfaces of the wall stud 205 as shown. Mounting plate surface 902a is attached to the second side 302 of the wall 300 by bolts which go through the wall 300 and attach to the television monitor 401 on the opposite first side 301 of the wall 300 to secure the television monitor 401 flush against the first side 301 of the wall 300. Various alternative means for fastening other than bolts and screws may also be used such as those described above with respect to television wall mount 100.

In various alternative embodiments, the first piece of the wall mount kit 900a may have only one mounting plate surface, such as mounting plate surface 901a, that is attached to the wall stud 205 to secure the first piece of the wall mount kit 900a to the wall stud 205. In embodiments where the first piece of the wall mount kit 900a has only one mounting plate surface to secure the first piece of the wall mount kit 900a to the wall stud 205, then this one mounting plate surface is connected to the mounting plate surface 902a configured to be attached to the second side 302 of the wall 300.

The second piece of the wall mount kit 900b includes a first mounting plate surface 901b connected to a second mounting plate surface 903b configured to be attached behind the wall 300 to a first wall stud 206 that is located behind the wall 300. The first mounting plate surface 901b and second mounting plate surface 903b are configured to be attached, for example, by screws, to respective surfaces of the wall stud 206 as shown. Mounting plate surface 902b is attached to the second side 302 of the wall 300 by bolts which go through the wall 300 and attach to the television monitor 401 on the opposite first side 301 of the wall 300 to secure the television monitor 401 flush against the first side 301 of the wall 300. Various alternative means for fastening other than bolts and screws may also be used such as those described above with respect to television wall mount 100.

In various alternative embodiments, the second piece of the wall mount kit 900b may have only one mounting plate surface, such as mounting plate surface 901b, that is attached to the wall stud 206 to secure the second piece of the wall mount kit 900b to the wall stud 206. In embodiments where the second piece of the wall mount kit 900b has only one mounting plate surface to secure the second piece of the wall mount kit 900b to the wall stud 206, then this one mounting plate surface is connected to the mounting plate surface 902b configured to be attached to the second side 302 of the wall 300.

In an alternate implementation of that shown in FIG. 6, one or more of the first piece 900a and second piece 900b of the wall mounting kit may be rotated 180 degrees such that the mounting plate surface 901a and/or mounting plate surface 901b are instead attached to exterior surfaces of the respective wall studs 205 and 206 instead of the interior surfaces of the respective wall studs 205 and 206 as shown in FIG. 6.

While various embodiments have been described hereinabove, it is to be appreciated that various changes in form and detail may be made without departing from the spirit and scope of the invention(s) presently or hereafter claimed.

The invention claimed is:

1. A television monitor wall mount comprising:
    a first mounting plate surface of the television monitor wall mount configured to be attached behind a wall to a wall stud that is located behind the wall, the wall having a first side on which a television monitor is to be mounted and a second side opposite the first side;
    a second mounting plate surface of the television monitor wall mount connected to the first mounting plate surface, the second mounting plate surface configured to be attached behind the wall to the second side of the wall that is opposite the first side, the second mounting plate surface having at least one hole through which a television mount fastener is able to be placed to mount the television monitor on the first side of the wall opposite the second side; and
    the television mount fastener placed in the at least one hole and extending through the second mounting plate surface in such a manner that the television monitor is able to be fastened to the television mount fastener on the first side of the wall opposite the second side.

2. The television monitor wall mount of claim 1 wherein the first mounting plate surface configured to be attached behind the wall to the wall stud has at least one hole through which a fastener is able to be placed to attach the first mounting plate surface behind the wall to a first planar surface of the wall stud.

3. The television monitor wall mount of claim 2 further comprising a third mounting plate surface connected to the first mounting plate surface, the third mounting plate surface configured to abut a second planar surface of the wall stud that is located behind the wall.

4. The television monitor wall mount of claim 3 wherein the third mounting plate surface connected to the first mounting plate surface has at least one hole through which a fastener is able to be placed to attach the third mounting plate surface to the second planar surface of the wall stud.

5. The television monitor wall mount of claim 4 further comprising a fourth mounting plate surface connected to the third mounting plate surface, the fourth mounting plate surface configured to abut a third planar surface of the wall stud that is located behind the wall.

6. The television monitor wall mount of claim 5 wherein the fourth mounting plate surface connected to the third mounting plate surface has at least one hole through which a fastener is able to be placed to attach the fourth mounting plate surface to the third planar surface of the wall stud.

7. The television monitor wall mount of claim 6 further comprising a fifth mounting plate surface connected to the fourth mounting plate surface, the fifth mounting plate surface configured to be attached to the second side of the wall that is opposite the first side.

8. The television monitor wall mount of claim 7 wherein the fifth mounting plate surface connected to the fourth mounting plate surface has at least one hole through which a fastener is able to be placed to mount the television monitor on the first side of the wall opposite the second side.

9. The television monitor wall mount of claim 8 wherein the first mounting plate surface is perpendicular to the second and third mounting plate surfaces and the fourth mounting plate surface is perpendicular to the third and fifth mounting plate surfaces.

10. The television monitor wall mount of claim 1 wherein the television monitor wall mount is configured to be clamped on the wall stud behind the wall.

11. The television monitor wall mount of claim 1 wherein the fastener is selected from the group consisting of: a screw, a bolt, a pin, a bar, a hook and a nail.

12. The television monitor wall mount of claim 1 wherein the at least one hole in the second mounting plate surface includes a plurality of holes.

13. The television monitor wall mount of claim 12 wherein the plurality of holes includes at least two holes.

* * * * *